United States Patent [19]

Ohashi et al.

[11] 4,205,136
[45] May 27, 1980

[54] PROCESS FOR PRODUCING A RIGID POLYURETHANE FOAM HAVING EXCELLENT FLAME RETARDANCE AND LOW-SMOKE DEVELOPMENT

[75] Inventors: Takashi Ohashi, Iruma; Minoru Kojima, Ohme; Masako Yoshida, Kodaira; Toru Okuyama, Sagamihara; Ryozo Sakata, Higashiyamato, all of Japan

[73] Assignee: Bridgestone Tire Company Limited, Tokyo, Japan

[21] Appl. No.: 13,751

[22] Filed: Feb. 21, 1979

[30] Foreign Application Priority Data

Feb. 21, 1978 [JP] Japan .................................. 53-18080

[51] Int. Cl.² ...................... C08G 18/14; C08G 18/32; C08G 18/26
[52] U.S. Cl. .................................. 521/118; 428/315; 521/124; 521/125; 521/127; 521/129; 521/131; 521/167; 521/173; 521/175; 521/176; 521/177; 521/902; 521/903
[58] Field of Search ............... 521/902, 903, 176, 173, 521/175, 118, 124, 125, 127, 129, 131, 167, 177

[56] References Cited

U.S. PATENT DOCUMENTS

| | | | |
|---|---|---|---|
| 3,591,532 | 7/1971 | Abercrombie et al. | 521/173 |
| 3,933,694 | 1/1976 | Wysocki | 521/903 |
| 3,956,202 | 5/1976 | Iwasaki | 521/903 |
| 4,039,487 | 8/1977 | Kolakowski et al. | 521/902 |
| 4,133,781 | 1/1979 | Ashida et al. | 521/902 |
| 4,145,318 | 3/1979 | Ohashi et al. | 521/903 |

OTHER PUBLICATIONS

Japanese Patent Application Publications 3,397/71; 43,398/74; 17,999/76; 12,238/77; 15,118/77 and 15,119/77.
Japanese Patents Laid Open 34,698/75; 78,699/75; 92,997/75; 88,014/75; 127,997/75.

*Primary Examiner*—H. S. Cockeram
*Attorney, Agent, or Firm*—Sughrue, Rothwell, Mion, Zinn and Macpeak

[57] ABSTRACT

A process for producing a rigid polyurethane foam having excellent flame retardance and low-smoke development is disclosed. When the rigid polyurethane foam is produced by reacting a polyhydroxyl compound with an organic polyisocyanate in the presence of a blowing agent, a surfactant, a catalyst and other additives, 3-methylpentane-1,3,5-triol is used as a part of the polyhydroxyl compound.

15 Claims, No Drawings

PROCESS FOR PRODUCING A RIGID POLYURETHANE FOAM HAVING EXCELLENT FLAME RETARDANCE AND LOW-SMOKE DEVELOPMENT

The invention relates to a process for producing a rigid polyurethane foam having excellent flame retardance and low-smoke development. More particularly, it relates to a process for producing a rigid polyurethane foam having excellent flame retardance and low-smoke development and less deterioration of foam properties wherein 3-methylpentane-1,3,5-triol is used as a part of a polyhydroxyl compound when the rigid polyurethane foam is produced by reacting the polyhydroxyl compound with an organic polyisocyanate in the presence of a blowing agent, a surfactant, a catalyst and other additives without adding a flame retardant.

Heretofore, the rigid polyurethane foam has widely been used for applications of thermal insulation material, construction material and the like owing to its excellent properties, particularly low thermal conductivity, but there is a great demerit that this foam is combustible. Recently, the regulation of flameproofing on plastics foam materials has a tendency to become severe, and particularly this tendency is conspicuous in the applications for automobiles, railway vehicles, airplanes, building materials and the like. Thus, the flameproofing of polyurethane foam becomes more important. However, conventionally proposed techniques are not satisfactory in the flameproofing and still have various drawbacks in industrial practicability.

Various attempts have hitherto been made to impart a flame retardance to the rigid polyurethane foam. They are divided broadly into two processes, one of which being the use of a phosphorus and/or halogen containing compound, a metal oxide, a metal hydroxide, an inorganic salt or the like as an additive-type flame retardant and the other of which being the use of a polyhydroxyl compound or a polyisocyanate having phosphorus and/or halogen atom as a reactive-type flame retardant. However, these processes have the following drawbacks. In case of the additive-type flame retardant, the effect is apt to lower with a lapse of time, so that a great amount of this retardant added is required for retaining a good flame retardance and consequently, there is caused the deterioration of physical and mechanical properties of foam such as density, mechanical strength, dimensional stability and the like of the resulting polyurethane foam. On the other hand, the reactive-type flame retardant is generally poor in the hydrolytic stability, so that when using a two-part liquid composition composed of a premix of the above retardant and a polyisocyanate component, the stability of the premix is poor and the long preservation of such composition becomes impossible. Furthermore, the foaming stability and foam properties are apt to degrade due to the presence of reactive phosphorus or halogen atom, so that it is difficult to add a great amount of the reactivetype flame retardant to the composition and as a result, the additive effect is hardly developed and further there is a tendency to cause undesirable phenomena such as scorching and the like. In any case, the resulting foam contains an acidic substance induced from the flame retardant, resulting in the corrosion of metal substrate and also there is a serious problem on the low-smoke development because the amount of smoke generated in the combustion is apt to increase rather as compared with the case of using no flame retardant.

Accordingly, under the above circumstances, it becomes a significant problem how to impart the flame retardance to rigid polyurethane foams without using the flame retardant such as phosphorus containing compounds, halogen containing compounds or the like. For this purpose, there have been made attempts to impart the flame retardance or both the flame retardance and low-smoke development in the prior art as follows. That is, in order to effect the flameproofing of the foam without using the flame retardant, there are proposed some processes using a particular compound as a polyhydroxyl compound or a polyamino compound, which include, for example, an embodiment of using an addition product of a methylol compound obtained by the reaction of dihydroxydiphenyl compound and formaldehyde with an alkylene oxide as a polyhydroxyalkylene polyol (Japanese Patent Application Publication No. 3,397/71), an embodiment of using furfuryl alcohol and a compound having in its molecule an isocyanurate ring as a polyhydroxyl compound in the presence of an isocyanate trimerization catalyst (Japanese Patent Application Publication No. 43,398/74), an embodiment of using formaldehyde polymer and an addition product of tris(2-hydroxyethyl)isocyanurate with an alkylene oxide as a polyhydroxyl compound (Japanese Patent Application Publication No. 17,999/76), an embodiment of using a reaction product of crude tall oil and dialkanolamine as a polyhydroxyl compound (Japanese Patent Laid Open No. 34,698/75), an embodiment of using a reaction product of an alkylene oxide with a distillation residue used as a part or whole of an initiator for the production of polyhydroxyl compound, which is byproduced in the production of organic polyisocyanate by phosgenation of organic polyamine, as a polyhydroxyl compound (Japanese Patent Application Publication No. 12,238/77), and an embodiment of using a nitrogen-containing aliphatic or aromatic polyhydroxyl or polyamino compound as a low molecular weight compound having active hydrogen together with a polyhydroxyl compound (Japanese Patent Application Publication No. 15,118/77 and No. 15,119/77). Moreover, in order to impart the low-smoke development as well as the flame retardance, there are proposed some processes wherein powdery cellulose and/or cellulose derivative or powdery starch and/or starch derivative is added to the foaming composition commonly used for the production of rigid polyurethane foam so as to accelerate carbonization of the foam surface in the combustion (Japanese Patent Laid Open No. 78,699/75 and No. 92,997/75). In these processes, however, when the particular compound is prepared separately and added to the foaming composition, the production step becomes complicated and economical costs are expensive. Further, when the particular compound is added in a powder form, there is a problem on the mixing agitation during the foaming process. Therefore, it is not yet developed an effective and economical process for imparting the flame retardance and low-smoke development to the polyurethane foam without deteriorating foam properties of the product.

With the foregoing in mind, the inventors have made various studies with respect to a process for imparting the flame retardance and low-smoke development to rigid polyurethane foams without using a halogen- or phosphorus-containing compound and as a result, it has been found out that when a low molecular weight polyhydroxyl compound called 3-methylpentane-1,3,5-triol is used together with a polyhydroxyl compound commonly used in the production of rigid polyurethane foam during the foaming process, rigid polyurethane foams having excellent flame retardance and low-smoke development and less deterioration of physical properties of foam can be obtained.

According to the invention, there is provided a process for producing a rigid polyurethane foam having excellent flame retardance and low-smoke development by reacting a polyhydroxyl compound with an organic polyisocyanate in the presence of a blowing agent, a surfactant, a catalyst and other additives, characterized in that 3-methylpentane-1,3,5-triol is used as a part of the polyhydroxyl compound.

Generally, it is known that the rigid polyurethane foam obtained by reacting a commonly used polyhydroxyl compound with an organic polyisocyanate is a combustible foamed material and does not exhibit a flame retardance so long as it does not contain a flame retardant. On the contrary, the feature that the rigid polyurethane foam accordng to the invention has excellent flame retardance and low-smoke development is apparently based on the use effect of 3-methylpentane-1,3,5-triol using together with the polyhydroxyl compound.

According to the invention, 3-methylpentane-1,3,5-triol of the low molecular weight polyhydroxyl compound is a by-product in the production of isoprene and is disused by combustion until now owing to poor utility and combustibility. Further, this compound has three hydroxyl groups inclusive of a hydroxyl group bonded to a tertiary carbon atom in its molecule, so that it exhibits peculiar properties different from trivalent alcohols such as glycerine, trimethylol propane and the like, which are called as triol in the art, i.e. it has high boiling point, low solidifying point, high degree of hydrophilicity, adequate lipophilicity and the like.

It is well-known to produce polyether-polyol as a urethane forming material by using 3-methylpentane-1,3,5-triol as an initiator like the polyhydric alcohol such as glycerine, trimethylol propane, 1,2,6-hexanetriol or the like because 3-methylpentane-1,3,5-triol has three hydroxyl groups (Japanese Patent Laid Open No. 88,014/75). Further, this reference discloses that polyurethane foam obtained by using the above polyetherpolyol is excellent in the compression strength, shock absorbing property, dimensional stability and the like, but does not teach the flame resistance and low-smoke development at all. The inventors have confirmed that the polyurethane foam obtained by the above known process exhibits a combustibility as apparent from Comparative Example 3 mentioned below. This fact shows that the polyetherpolyol obtained by using 3-methylpentane-1,3,5-triol as an initiator and subjecting to an addition reaction with an alkylene oxide in the presence of an alkaline catalyst is merely included in the polyhydroxyl compound used as a starting material for the production of rigid polyurethane foams and the flame retardance is not imparted to the resulting polyurethane foam so long as the flame retardant is not added to the foam forming composition containing the polyetherpolyol.

Thus, 3-methylpentane-1,3,5-triol is known to be used as the initiator for the production of polyether-polyol, but it is not known until now that when 3-methylpentane-1,3,5-triol itself is used together with the commonly used polyhydroxyl compound to produce a rigid polyurethane foam, the excellent flame retardance and low-smoke development can be imparted to the resulting polyurethane foam without using the flame retardant. The inventors have already confirmed that when a low molecular weight polyhydroxyl compound such as trimethylol propane, glycerine or the like is used as a part of the polyhydroxyl compound to produce a flexible polyurethane foam of a hot-cure system without adding the flame retardant, the resulting foam has the flame retardance and low-smoke development enough to satisfy a self-extinguishing grade according to a combustion test ASTM D-1692-59T, but when 3-methylpentane-1,3,5-triol is used as the low molecular weight polyhydroxyl compound in the above process, the resulting foam is combustible as apparent from Comparative Example 10 mentioned below (Japanese Patent Laid Open No. 127,997/75). Now, the inventors have made various studies with respect to a process for imparting the flame retardance and low-smoke developent to the rigid polyurethane foam and grasped the performance of 3-methylpentane-1,3,5-triol as a result of the followings. That is, the hydroxyl number of the polyhydroxyl compound used in the production of rigid polyurethane foams is larger than that in the production of flexible polyurethane foams, so that a great amount of an organic polyisocyanate is required and consequently the structure and amount of the low molecular weight polyhydroxyl compound used for controlling the reactivity are restricted as a matter of course. Further, in the general process for the production of rigid polyurethane foams, it is very difficult to practically use substances having a poor miscibility with the organic polyisocyanate or trichloromonofluoromethane widely used as a blowing agent.

The inventors have made further investigations with respect to the low molecular weight polyhydroxyl compounds considering the above mentioned factors, i.e. miscibility, reactivity, flame retardance and the like and found out that 3-methylpentane-1,3,5-triol well satisfies the factors and develops a remarkable effect on the flame retardance and low-smoke development.

According to the invention, it makes possible to produce a rigid polyurethane foam having excellent foam properties besides flame retardance and low-smoke development.

In the practice of the invention, all of foam forming compositions usually used in the production of rigid polyurethane foams can be used. That is, there can be used the foam forming composition for the production of the rigid polyurethane foam by reacting a polyhydroxyl compound having in its molecule 3 or more hydroxyl groups and a hydroxyl number of not less than 100 with an organic polyisocyanate in the presence of a blowing agent, a surfactant, a catalyst and other additives and, if necessary, a flame retardant.

The polyhydroxyl compound to be used in the invention includes all of ones commonly used in the production of rigid polyurethane foams. For example, there are mentioned polyether-polyols obtained by ring opening addition polymerization of one or more of alkylene oxides such as ethylene oxide, propylene oxide, butylene oxide and the like using a reaction initiator selected from glycerine, trimethylol propane, 3-methylpentane-1,3,5-triol, pentaerythritol, sorbitol, sucrose, ethylenediamine, diethylenetriamine and the like; and polyesterpolyols having a hydroxyl group at its terminal, which are obtained by condensation reaction of dicarboxylic acid such as adipic acid, phthalic acid or the like with an excessive amount of a polyhydric alcohol such as ethylene glycol, diethylene glycol, trimethylol propane and the like. The polyhydroxyl compound to be used is preferable to have 3 or more hydroxyl groups in its molecule and a hydroxyl number of not less than 100, preferably not less than 150. These polyhydroxyl compounds may be used alone or in admixture of two or more compounds.

According to the invention, the organic polyisocyanate means an organic compound having two or more isocyanate groups in one molecule and includes aliphatic polyisocyanates, aromatic polyisocyanates, mixtures and modified substances thereof.

As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, bitolylene diisocyanate, naphthalene diisocyanate (e.g., 1,5-naphthalene diisocyanate), triphenylmethane triisocyanate, dianisidine diisocyanate, xylylene diisocyanate, tris-(isocyanate phenyl)thiophosphate, polynuclear polyisocyanate having the following formula

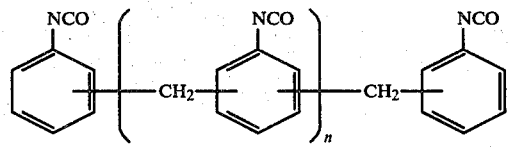

(so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having an urethane group, a biuret group, an isocyanurate group, a carbodiimide group, an oxazolidone group or the like may be used. These polyisocyanates may be used alone or in admixture of two or more polyisocyanates. As the organic polyisocyanate, the aromatic polyisocyanates, particularly polynuclear aromatic polyisocyanates are preferable in view of flame retardance and other properties.

The amount of the organic polyisocyanate used per the total amount of the polyhydroxyl compound, i.e. isocyanate index thereof is usually within a range of 80-300, but it is preferable that the isocyanate index is within a range of 90-150 in case of using a catalyst for the production of common polyurethane foam as mentioned below and within a range of 100-250 in case of using an isocyanurate forming catalyst in view of the production condition and the balance between the flame retardance and low-smoke development of the resulting foam and other foam properties.

The low molecular weight polyhydroxyl compound to be used in the invention, i.e. 3-methylpentane-1,3,5-triol is a colorless, transparent and viscous liquid at room temperature and has properties similar to glycerine, but its solubility against various organic solvents is fairly different from that of glycerine. That is, 3-methylpentane-1,3,5-triol exhibits a strong hydrophilicity owing to three hydroxyl groups existent in the molecule and is more lipohilic rather than glycerine because the number of carbon atoms per hydroxyl group is two times of that of glycerine and the carbon chain is long. Therefore, the miscibility of 3-methylpentane-1,3,5-triol with various organic solvents is higher than that of glycerine. A commercially available 3-methylpentane-1,3,5-triol (sold by Kuraray Co. Ltd., as a trade name of Petoriol) can be used as it is.

According to the invention, 3-methylpentane-1,3,5-triol is used in an amount of 0.2–2.0 equivalent to the hydroxyl equivalent of the polyhydroxyl compound used in the production of the rigid polyurethane foam, but it is preferably used in an amount of 0.5–1.5 equivalent to the hydroxyl equivalent of the polyhydroxyl compound in order to obtain a rigid polyurethane foam satisfying the desired flame retardance and low-smoke development in view of the miscibility, reactivity and the like.

As the catalyst, use may be made of any ones commonly used in the production of polyurethane foams, an example of which includes triethylamine, triethylenediamine, tetramethylethylenediamine, dimethylethanolamine, dimethylcyclohexylamine, stannous octoate, dibutyltin dilaurate, lead octylate and the like. Further, there can be used an isocyanurate forming catalyst such as N,N'N"-tris(dialkylaminoalkyl)-sym-hexahydrotriazine, 2,4,6-tris(dimethylaminomethyl) phenol, 1,8-diazabicyclo(5,4,0)undecene-7, potassium acetate, potassium propionate, potassium caprylate, potassium 2-ethyl hexanoate, potassium adipate, sodium benzoate and the like.

According to the invention, all of blowing agents used in the production of polyurethane foams may be used. For instance, the blowing agent includes carbon dioxide gas generated by adding water to the reaction mixture or supplied from an exterior source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good miscibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. Among them, trichloromonofluoromethane is preferable as the blowing agent in view of the foam properties, easiness of foaming and the like. These blowing agents may be used alone or in an admixture thereof. The addition amount of the blowing agent influences the density of the resulting polyurethane foam, but it is usually 5 to 50% by weight of the foam forming composition.

In addition to the above mentioned ingredients, a surfactant, a modifying agent and other additives may be added, if necessary.

As the surfactant, use may be made of any ones having a foam stabilizing property and usually used in the production of polyurethane foam, an example of which includes an organosilicone surfactant such as organopolysiloxanepolyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01–5 parts by weight per 100 parts by weight of the organic polyisocyanate.

As the other additive, there are inorganic hollow particles, granulated refractory, fibrous materials, inorganic fillers and the like, which are used for improving the foam properties such as hardness and the like. The inorganic filler includes mica powder, finely divided clay, asbestos, calcium carbonate, silica gel, aluminum hydroxide, calcium hydroxide, magnesium hydroxide, gypsum, sodium silicate, silica sand, clays, diatomaceous earth, perlite, vermiculite, Shilas balloon, glass balloon, glass fiber, rock wool, asbestos fiber and the like.

Moreover, a flame retardant may be added without deviating the effect of the invention. According to the invention, the flame retardant usually used in the common polyurethane foam is effective and includes halogenated organic phosphorus compounds such as tris(chloroethyl) phosphate, tris(dichloropropyl) phosphate, tris(dibromopropyl) phosphate and the like; and inorganic flame retardant such as antimony oxide and the like.

According to the invention, rigid polyurethane foams can be produced by any well-known processes as mentioned below. For instance, the polyhydroxyl compound, 3-methylpentane-1,3,5-triol, organic polyisocyanate, surfactant, blowing agent, catalyst and other additives are uniformly mixed in a short time and then the resulting mixture is foamed in a mold and cured by a physical or chemical means. Alternatively, it is advantageously and widely performed that a part or whole of each of polyhydroxyl compound, 3-methylpentane-1,3,5-triol and organic polyisocyanate is previously reacted with each other before they are mixed with the other ingredients. The production of the rigid polyurethane foam according to the invention can be carried out not only by the above described process but also by the other well-known process.

The rigid polyurethane foam according to the invention not only has excellent flame retardance and low-smoke development, but also retains properties inherent to rigid polyurethane foam, e.g. light weight, high strength, thermal insulating property, high dimensional stability and the like as they are. Therefore, the rigid polyurethane foam according to the invention is usable as a thermal insulating material for various tanks in the form of single block or as various building materials, for example, building material, thermal insulating material, construction material and the like in the form of a pile product with a colored iron plate, zinc iron plate, aluminum foil, aluminum plate, gypsum board, transite plate, asbestos board, various flameproofed cloths, paper or the like by in-place foaming (sandwich structure of laminate structure).

The following examples are given in illustration of the invention with comparative examples and are not intended as limitations thereof. In the examples, all parts are by weight, unless otherwise stated.

In the rigid polyurethane foam, the burning characteristics are measured according to the method of ASTM D-1692-59T and the smoke development is measured by using an Arapahoe smoke chamber composed of a cylindrical combustion chamber of 12.7 cm diameter and a Bunsen microburner. In the latter case, a sample of 2×2×2 cm is supported on a sample-fixing member and burnt by means of the microburner at a flow rate of propane gas of 75 cm$^3$/min for 30 seconds. The gas and smoke generated in the burning of the sample are passed through a chimney with a diameter of 7.6 cm and a height of 61 cm connected above the combustion chamber, whereby they are cooled. The smoke entraining the combustion gas is adsorbed with a filtering paper covering orifices of a strong suction force. Then, the smoke weight adsorbed is measured and a percentage of the smoke weight per the previously weighed sample weight is expressed as the smoke development. Moreover, the foam properties are measured according to the method of JIS A-9514, the thermal conductivity is measured by using an Anacon K-factor measuring machine, and the friability is measured according to the method of ASTM C-421.

Examples 1–8, Comparative Examples 1–2

The ingredients other than an organic polyisocyanate were weighed in a polyethylene beaker of 1 l capacity at a compounding recipe shown in the following Table 1 and thoroughly mixed to form a premix composition, a miscibility of which was observed. Then, the organic polyisocyanate previously weighed in a stainless beaker of 200 ml capacity was added to the premix composition and the resulting mixture was agitated with a high-speed stirrer at room temperature for about 8 seconds. Thereafter, the reaction mixture was rapidly poured into a paper mold housed in an opened wooden box and foamed to produce a rigid polyurethane foam.

In Table 1, the term "blend ratio" means a ratio of hydroxyl equivalent of 3-methylpentane-1,3,5-triol to hydroxyl equivalent of commonly used polyhydroxyl compound, and the term "isocyanate index" means a ratio of isocyanate equivalent of the polyisocyanate to hydroxyl equivalent of a sum of active hydrogen-containing polyhydroxyl compounds reacting with the organic polyisocyanate.

Table 1-1-(a)

| | Example 1 | Example 2 | Example 3 | Example 4 | Example 5 |
|---|---|---|---|---|---|
| Compounding recipe (parts) | | | | | |
| crude diphenylmethane diisocyanate 1) | 100 | 100 | 100 | 100 | 100 |
| commonly used polyhydroxyl compound A2) | 34.3 | 32.6 | | | 45.7 |
| commonly used polyhydroxyl compound B3) | | | 37.9 | 36.0 | |
| 3-methylpentane-1,3,5-triol 4) | 13.8 | 13.1 | 9.2 | 8.8 | 9.2 |
| blend ratio | 1/1 | 1/1 | 2/1 | 2/1 | 2/1 |
| dimethylethanolamine | 0.1 | | 0.1 | | 0.1 |
| triethylenediamine 5) | 0.1 | | 0.1 | | 0.1 |
| dimethyltin dilaurate | 0.1 | | 0.1 | | 0.1 |
| potassium acetate 6) | | 2.4 | | 2.4 | |
| N,N',N''-tris(dimethylaminopropyl)-sym-hexahydrotriazine 7) | | 0.5 | | 0.5 | |
| silicone surfactant 8) | 1.0 | 1.0 | 1.0 | 1.0 | 1.0 |
| trichloromonofluoromethane 9) | 25.0 | 25.0 | 28.0 | 25.0 | 27.0 |
| isocyanate index | 120 | 120 | 120 | 120 | 120 |
| Foaming behavior | | | | | |
| miscibility of premix composition | miscible | miscible | miscible | miscible | miscible |

Table 1-1-(a)-continued

| | Example 1 | Example 2 | Example 3 | Example 4 | Example 5 |
|---|---|---|---|---|---|
| cream time (second) | 12 | 17 | 12 | 20 | 11 |
| rise time (second) | 35 | 38 | 50 | 56 | 35 |

Table 1-1-(b)

| | Example 6 | Example 7 | Example 8 | Comparative Example 1 | Comparative Example 2 |
|---|---|---|---|---|---|
| Compounding recipe (parts) | | | | | |
| crude diphenylmethane diisocyanate 1) | 100 | 100 | 100 | 100 | 100 |
| commonly used polyhydroxyl compound A2) | | 43.5 | | 68.5 | |
| commonly used polyhydroxyl compound B3) | 28.4 | | 19.9 | | 54.0 |
| 3-methylpentane-1,3,5-triol 4) | 13.8 | 8.8 | 9.7 | | |
| blend ratio | 1/1 | 2/1 | 1/1 | | |
| dimethylethanolamine | 0.1 | | | 0.1 | |
| triethylenediamine 5) | 0.1 | | | 0.1 | |
| dimethyltin dilaurate | 0.1 | | | 0.1 | |
| potassium acetate 6) | | 2.4 | 2.4 | | 2.4 |
| N,N',N''-tris(dimethylaminopropyl)-sym-hexahydrotriazine 7) | | 0.5 | 0.5 | | 0.5 |
| silicone surfactant 8) | 1.0 | 1.0 | 1.0 | 1.0 | 1.0 |
| trichloromonofluoromethane 9) | 26.0 | 27.0 | 21.0 | 30.0 | 29.0 |
| isocyanate index | 120 | 120 | 160 | 120 | 120 |
| Foaming behavior | | | | | |
| miscibility of premix composition | miscible | miscible | miscible | miscible | miscible |
| cream time (second) | 13 | 12 | 23 | 11 | 16 |
| rise time (second) | 45 | 40 | 52 | 50 | 53 |

Table 1-2-(a)

| | Example 1 | Example 2 | Example 3 | Example 4 | Example 5 |
|---|---|---|---|---|---|
| Burning characteristics | | | | | |
| judgement | self-extinguishing | self-extinguishing | self-extinguishing | self-extinguishing | self-extinguishing |
| burning distance (mm) | 27 | 33 | 33 | 31 | 36 |
| Smoke development | | | | | |
| smoke ratio (wt.%) | 9.0 | 9.5 | 9.4 | 9.2 | 9.7 |
| Foam properties | | | | | |
| foam density (g/cm$^3$) | 0.0292 | 0.0250 | 0.0255 | 0.0237 | 0.0289 |
| 10% compression strength (kg/cm$^2$) | | | | | |
| parallel to rise | 2.3 | 1.8 | 1.8 | 1.9 | 2.4 |
| perpendicular to rise | 1.0 | 0.7 | 0.8 | 0.6 | 1.0 |
| dimensional stability (%) (70° C. × 48 hrs.) | | | | | |
| parallel to rise | −0.2 | −0.6 | −0.3 | −0.4 | −0.3 |
| perpendicular to rise | +1.2 | +1.1 | +0.8 | +0.8 | +1.4 |
| Thermal conductivity (Kcal/mh °C.) | 0.0154 | 0.0213 | 0.0164 | 0.0187 | 0.0159 |
| Friability (weight reduction ratio %) | 4.0 | 10.0 | 14.0 | 12.0 | 5.0 |

Note:
1 organic polyisocyanate having an isocyanate equivalent of 133, made by Nippon Polyurethane Co. Ltd., as a trade name of Coronate 47, hereinafter abbreviated as crude MDI.
2 poly(oxypropylene) tetraol, hydroxyl number 500, made by Asahi Denka Kogyo Co. Ltd., trade name Adeka Polyether EDP-450.
3 amine-based polyether, hydroxyl number 610, made by Dainippon Ink Kagaku Kogyo Co. Ltd., trade name Hyprox R-310.
4 hydroxyl number 1272, made by Kuraray Co. Ltd., trade name Petoriol.

Table 1-2-(b)

| | Example 6 | Example 7 | Example 8 | Comparative Example 1 | Comparative Example 2 |
|---|---|---|---|---|---|
| Burning characteristics | | | | | |
| judgement | self-extinguishing | self-extinguishing | self-extinguishing | burn | burn |
| burning distance (mm) | 29 | 45 | 30 | | |
| Smoke development | | | | | |
| smoke ratio (wt. %) | 8.8 | 9.8 | 9.0 | 11.5 | 11.2 |
| Foam properties | | | | | |
| foam density (g/cm$^3$) | 0.0262 | 0.0252 | 0.0263 | 0.0298 | 0.0231 |
| 10% compression strength (kg/cm$^2$) | | | | | |
| parallel to rise | 1.8 | 1.8 | 1.8 | 2.7 | 1.5 |
| perpendicular to rise | 0.8 | 0.7 | 0.8 | 0.9 | 0.5 |
| dimensional stability (%) (70° C. × 48 hrs.) | | | | | |
| parallel to rise | −0.3 | −0.7 | −0.4 | −0.5 | −0.5 |
| perpendicular to rise | +0.8 | +1.4 | +1.0 | +1.7 | +1.0 |

Table 1-2-(b)-continued

|  | Example 6 | Example 7 | Example 8 | Comparative Example 1 | Comparative Example 2 |
|---|---|---|---|---|---|
| Thermal conductivity (Kcal/mh °C.) | 0.0168 | 0.0173 | 0.0181 | 0.0166 | 0.0209 |
| Friability (weight reduction ratio %) | 5.0 | 13.0 | 17.0 | 4.0 | 20.0 |

Note:
(5) 33% solution of triethylenediamine in dipropylene glycol, made by Houdry Process Corporation as a trade name of DABCO-33LV, hereinafter abbreviated as DABCO-33LV.
(6) 33% solution of potassium acetate in diethylene glycol, hereinafter abbreviated as KOAc/DEG.
(7) Polycat 41 (trade name) made by Abbott Laboratories, hereinafter abbreviated as P-41.
(8) SH-193 (trade name) made by Toray Silicone Co. Ltd.
(9) The compound is abbreviated as F-11 hereinafter.

Moreover, the smoke ratio measured under the same conditions as described above was 11.0% in case of commercially available rigid and combustible polyurethane foam, 14.9% in case of flame-retarded rigid polyurethane foam using a phosphorus-containing polyol, and 11.8% in case of flame-retarded rigid polyurethane foam containing 25 parts of tris(chloropropyl) phosphate as a flame retardant. From these facts, it can be seen that the rigid polyurethane foam according to the invention exhibits excellent flame retardance and low-smoke development without using a flame retardant.

Furthermore, as seen from the Comparative Examples 1 and 2, the flame-retarded rigid polyurethane foam cannot be obtained when 3-methylpentane-1,3,5-triol is not used together with the polyhydroxyl compound.

EXAMPLES 9–16

The same procedure as described in Example 1 was repeated to produce a rigid polyurethane foam by using the compounding recipe as shown in the following Table 2 and changing the blend ratio of 3-methylpentane-1,3,5-triol and the isocyanate index.

Table 2-1

|  | Example 9 | Example 10 | Example 11 | Example 12 | Example 13 | Example 14 | Example 15 | Example 16 |
|---|---|---|---|---|---|---|---|---|
| Compounding recipe (parts) | | | | | | | | |
| crude MDI | 100 | 100 | 100 | 100 | 100 | 100 | 100 | 100 |
| polyhydroxyl compound C1) | 39.1 | 29.4 | 21.6 | 17.0 | | | | |
| polyhydroxyl compound D2) | | | | | 42.9 | 39.1 | 28.9 | 22.7 |
| 3-methylpentane-1,3,5-triol | 8.7 | 13.1 | 9.7 | 7.6 | 19.2 | 17.5 | 12.9 | 10.1 |
| blend ratio | 2/1 | 1/1 | 1/1 | 1/1 | 1/2 | 1/2 | 1/2 | 1/2 |
| isocyanate index | 120 | 120 | 160 | 200 | 110 | 120 | 160 | 200 |
| KOAc/DEG | 2.4 | 2.4 | 2.4 | 2.4 | 2.4 | 2.4 | 2.4 | 2.4 |
| P-41 | 0.5 | 0.5 | 0.5 | 0.5 | 0.5 | 0.5 | 0.5 | 0.5 |
| SH-193 | 1.0 | 1.0 | 1.0 | 1.0 | 1.0 | 1.0 | 1.0 | 1.0 |
| F-11 | 25.0 | 24.0 | 20.0 | 19.0 | 23.0 | 21.0 | 20.0 | 18.0 |
| Foaming behavior | | | | | | | | |
| miscibility of premix composition | miscible | miscible | miscible | miscible | miscible | miscible | miscible | miscible |
| cream time (second) | 22 | 23 | 22 | 18 | 17 | 16 | 14 | 12 |
| rise time (second) | 57 | 52 | 50 | 38 | 44 | 44 | 38 | 30 |
| Burning characteristics | | | | | | | | |
| judgement | self-extinguishing | self-extinguishing | self-extinguishing | self-extinguishing | self-extinguishing | self-extinguishing | self-extinguishing | self-extingusihing |
| burning distance (mm) | 40 | 34 | 32 | 26 | 53 | 40 | 35 | 31 |

Table 2-2

|  | Example 9 | Example 10 | Example 11 | Example 12 | Example 13 | Example 14 | Example 15 | Example 16 |
|---|---|---|---|---|---|---|---|---|
| Smoke development | | | | | | | | |
| smoke ratio (wt. %) | 9.7 | 9.2 | 9.0 | 9.0 | 10.4 | 9.7 | 9.2 | 8.9 |
| Foam properties | | | | | | | | |
| foam density (g/cm$^3$) | 0.0238 | 0.0229 | 0.0248 | 0.0250 | 0.0297 | 0.0292 | 0.0275 | 0.0293 |
| 10% compression strength (kg/cm$^2$) | | | | | | | | |
| parallel to rise | 1.2 | 1.2 | 1.2 | 1.4 | 0.9 | 0.9 | 1.1 | 1.5 |
| perpendicular to rise | 0.4 | 0.4 | 0.3 | 0.4 | 0.6 | 0.5 | 0.3 | 0.6 |
| dimensional stability (%) (70° C. × 48 hrs.) | | | | | | | | |
| parallel to rise | −0.9 | −0.8 | −0.7 | −0.8 | −0.5 | −0.5 | −1.0 | −0.8 |
| perpendicular to rise | +1.9 | +1.9 | +2.6 | +2.2 | +1.7 | +2.0 | +1.1 | +2.6 |
| Thermal conductivity (Kcal/mh °C.) | 0.0201 | 0.0202 | 0.0210 | 0.0208 | 0.0171 | 0.0167 | 0.0173 | 0.0183 |
| Friability | | | | | | | | |

Table 2-2-continued

|  | Example 9 | Example 10 | Example 11 | Example 12 | Example 13 | Example 14 | Example 15 | Example 16 |
|---|---|---|---|---|---|---|---|---|
| (weight reduction ratio %) | 4.0 | 6.0 | 10.0 | 13.0 | 3.0 | 5.0 | 7.0 | 9.0 |

Note:
(1) poly(oxypropylene) diol, hydroxyl number 560, made by Sanyo Kasei Kogyo Co. Ltd., trade name Sannix Diol PP-200
(2) poly(oxypropylene) diol, hydroxyl number 280, made by Sanyo Kasei Kogyo Co. Ltd., trade name Sannix Diol PP-400

As seen from the data of Table 2, the flame-retarded rigid polyurethane foam can be produced even by changing the blend ratio and isocyanate index. Particularly, the isocyanate index considerably contributes to an improvement of the flameproofing.

Moreover, when the polyhydroxyl compound, particularly Sannix Diol PP-400 is used alone without the addition of 3-methylpentane-1,3,5-triol, it has been confirmed that a shrinkage phenomenon is caused during the foaming and a satisfactory foam is not obtained.

This fact shows that 3-methylpentane-1,3,5-triol not only contributes to the improvement of flame retardance and low-smoke development but also has an effect for the production of good foam.

EXAMPLES 17–27

The same procedure as described in Example 1 was repeated to produce a rigid polyurethane foam by using the compounding recipe as shown in the following Table 3 and changing the blend ratio of 3-methylpentane-1,3,5-triol and the kind of silicone surfactant.

Table 3-1-(a)

|  | Example 17 | Example 18 | Example 19 | Example 20 | Example 21 |
|---|---|---|---|---|---|
| Compounding recipe (parts) |  |  |  |  |  |
| crude MDI | 100 | 100 | 100 | 100 | 100 |
| polyhydroxyl compound A | 34.3 | 34.3 | 34.3 | 34.3 | 34.3 |
| polyhydroxyl compound B |  |  |  |  |  |
| 3-methylpentane-1,3,5-triol | 13.8 | 13.8 | 13.8 | 13.8 | 13.8 |
| blend ratio | 1/1 | 1/1 | 1/1 | 1/1 | 1/1 |
| dimethylethanolamine |  | 0.05 | 0.05 | 0.05 | 0.05 |
| DABCO-33LV |  | 0.05 | 0.05 | 0.05 | 0.05 |
| dimethyltin dilaurate |  | 0.05 | 0.05 | 0.05 | 0.05 |
| silicone surfactant | SH-193:1.0 | SRX-295:1.0 1) | L-5420:1.0 2) | BY-10-502:1.0 3) | BY-10-504.1.0 4) |
| $H_2O$ |  |  |  |  |  |
| F-11 | 25.0 | 25.0 | 25.0 | 25.0 | 25.0 |
| isocyanate index | 120 | 120 | 120 | 120 | 120 |
| Foaming behavior |  |  |  |  |  |
| miscibility of premix composition | miscible | miscible | miscible | slightly immiscible | slightly immiscible |
| cream time (second) | 50 | 18 | 16 | 14 | 14 |
| rise time (second) | 150 | 60 | 46 | 54 | 60 |

Table 3-1-(b)

|  | Example 22 | Example 23 | Example 24 | Example 25 | Example 26 | Example 27 |
|---|---|---|---|---|---|---|
| Compounding recipe (parts) |  |  |  |  |  |  |
| crude MDI | 100 | 100 | 100 | 100 | 100 | 100 |
| polyhydroxyl compound A |  |  |  |  |  |  |
| polyhydroxyl compound B | 42.6 | 37.9 | 37.9 | 37.9 | 37.9 | 37.9 |
| 3-methylpentane-1,3,5-triol | 6.9 | 9.2 | 9.2 | 9.2 | 9.2 | 9.2 |
| blend ratio | 3/1 | 2/1 | 2/1 | 2/1 | 2/1 | 2/1 |
| dimethylethanolamine | 0.05 | 0.05 | 0.05 | 0.05 | 0.05 | 0.05 |
| DABCO-33LV | 0.05 | 0.05 | 0.05 | 0.05 | 0.05 | 0.05 |
| dimethyltin dilaurate | 0.05 | 0.05 | 0.05 | 0.05 | 0.05 | 0.05 |
| silicone surfactant | SH-193:1.0 | SRX-295:1.0 | SH-193:1.0 | L-5420:1.0 | BY-10-504:1.0 | — |
| $H_2O$ |  |  |  | 0.3 |  |  |
| F-11 | 28.0 | 27.0 | 27.0 | 27.0 | 27.0 | 27.0 |
| isocyanate index | 120 | 120 | 115 | 120 | 120 | 120 |
| Foaming behavior |  |  |  |  |  |  |
| miscibility of premix composition | miscible | miscible | miscible | miscible | miscible | miscible |
| cream time (second) | 18 | 20 | 19 | 23 | 20 | 19 |
| rise time (second) | 67 | 75 | 62 | 72 | 64 | 54 |

Table 3-2-(a)

|  | Example 17 | Example 18 | Example 19 | Example 20 | Example 21 |
|---|---|---|---|---|---|
| Burning characteristics |  |  |  |  |  |
| judgement | self-extinguishing | self-extinguishing | self-extinguishing | self-extinguishing | self-extinguishing |
| burning distance (mm) | 40 | 41 | 38 | 42 | 51 |
| Smoke development |  |  |  |  |  |
| smoke ratio (wt. %) | 9.8 | 9.6 | 9.0 | 9.4 | 9.8 |
| Foam properties |  |  |  |  |  |
| foam density (g/cm$^3$) | 0.0313 | 0.0308 | 0.0305 | 0.0292 | 0.0299 |
| 10% compression strength (kg/cm$^2$) |  |  |  |  |  |

Table 3-2-(a)-continued

|  | Example 17 | Example 18 | Example 19 | Example 20 | Example 21 |
|---|---|---|---|---|---|
| parallel to rise | 2.4 | 1.1 | 2.6 | 2.5 | 2.6 |
| perpendicular to rise | 1.3 | 1.4 | 1.1 | 1.0 | 1.3 |
| dimensional stability (%) (70° C. × 48 hrs.) | | | | | |
| parallel to rise | −0.4 | −0.3 | −0.2 | −0.4 | −0.4 |
| perpendicular to rise | +1.2 | +1.2 | +1.1 | +1.2 | +0.9 |
| Thermal conductivity (Kcal/mh °C.) | 0.0160 | 0.0174 | 0.0151 | 0.0153 | 0.0149 |
| Friability (weight reduction ratio %) | 5.0 | 5.5 | 3.8 | 4.5 | 6.0 |

Table 3-2-(b)

|  | Example 22 | Example 23 | Example 24 | Example 25 | Example 26 | Example 27 |
|---|---|---|---|---|---|---|
| Burning characteristics | | | | | | |
| judgement | self-extinguishing | self-extinguishing | self-extinguishing | self-extinguishing | self-extinguishing | self-extinguishing |
| burning distance (mm) | 40 | 33 | 34 | 38 | 43 | 47 |
| Smoke development | | | | | | |
| smoke ratio (wt. %) | 10.5 | 9.6 | 9.8 | 10.0 | 10.4 | 10.8 |
| Foam properties | | | | | | |
| foam density (g/cm$^3$) | 0.0264 | 0.0262 | 0.0242 | 0.0267 | 0.0264 | 0.0264 |
| 10% compression strength (kg/cm$^2$) | | | | | | |
| parallel to rise | 2.3 | 2.2 | 2.3 | 2.1 | 2.5 | 1.0 |
| perpendicular to rise | 0.9 | 1.0 | 0.7 | 1.0 | 1.1 | 1.1 |
| dimensional stability (%) (70° C. × 48 hrs.) | | | | | | |
| parallel to rise | −0.4 | −0.3 | −0.5 | −0.2 | −0.3 | −0.4 |
| perpendicular to rise | +1.1 | +0.9 | +1.1 | +0.9 | +0.7 | +0.8 |
| Thermal conductivity (Kcal/mh °C.) | 0.0167 | 0.0179 | 0.0180 | 0.0174 | 0.0156 | 0.0177 |
| Friability (weight reduction ratio %) | 8.5 | 7.0 | 11.0 | 9.5 | 7.9 | 13.6 |

Note:
(1) made by Toray Silicone Co. Ltd., trade name SRX-295
(2) made by Union Carbide Corp., trade name L-5420
(3) made by Toray Silicone Co. Ltd., trade name BY-10-502
(4) made by Toray Silicone Co. Ltd., trade name BY-10-504

As seen from the data of Table 3, the rigid polyurethane foam having excellent flame retardance and low-smoke development can be produced even when adding no silicone surfactant, but it is preferable to use the silicone surfactant in view of the burning characteristics and foam properties. In the latter case, there can be used various silicone surfactants commonly used in the production of polyurethane foams.

EXAMPLES 28–38

Rigid polyurethane foams were produced under the same conditions as described in Example 2 except that various commonly used polyhydroxyl compounds as shown in the following Table 4 are used as the polyhydroxyl compound, the blend ratio of 3-methylpentane-1,3,5-triol is changed and the isocyanate index is set to 100. The results measured on the burning characteristics and smoke development of the resulting foam are also shown in Table 4.

Table 4-(a)

|  | Example 28 | Example 29 | Example 30 | Example 31 | Example 32 |
|---|---|---|---|---|---|
| Compounding recipe (parts) | | | | | |
| commonly used polyhydroxyl compound E(1) | 83.8 | 62.9 | 41.9 | 25.2 | |
| commonly used polyhydroxyl compound R(2) | | | | | 40.5 |
| commonly used polyhydroxyl compound G(3) | | | | | |
| commonly used polyhydroxyl compound H(4) | | | | | |
| commonly used polyhydroxyl compound I(5) | | | | | |
| commonly used polyhydroxyl compound J(6) | | | | | |
| 3-methylpentane-1,3,5-triol | 10.6 | 15.9 | 21.2 | 25.4 | 25.4 |
| blend ratio | 2/1 | 1/1 | 1/2 | 1/4 | 1/4 |
| Foaming behavior | | | | | |
| miscibility of premix composition | slightly immiscible | slightly immiscible | slightly immiscible | slightly immiscible | miscible |
| cream time (second) | 44 | 48 | 58 | 60 | 40 |
| rise time (second) | 101 | 105 | 110 | 137 | 76 |
| Foam density (g/cm$^3$) | 0.0267 | 0.0281 | 0.0297 | 0.0380 | 0.0284 |

Table 4-(a)-continued

|  | Example 28 | Example 29 | Example 30 | Example 31 | Example 32 |
|---|---|---|---|---|---|
| Burning characteristics | | | | | |
| judgement | self-extinguishing | self-extinguishing | self-extinguishing | self-extinguishing | self-extinguishing |
| burning distance (mm) | 38 | 45 | 33 | 42 | 40 |
| Smoke development | | | | | |
| smoke ratio (wt. %) | 10.1 | 10.6 | 9.8 | 10.0 | 10.3 |

Note:
(1) bisphenol-A based diol, hydroxyl number 310, made by Asahi Denka Kogyo Co. Ltd., trade name Adeka Polyether BPX-11.
(2) bisphenol diol, hydroxyl number 195, made by Asahi Denka Kogyo Co. Ltd., trade name Adeka Polyether BPX-33.
(3) pentaerythritol based tetraol, hydroxyl number 600, made by Dainippon Ink Kagaku Kogyo Co. Ltd., trade name Hyprox RQ-350.

Table 4-(b)

|  | Example 33 | Example 34 | Example 35 | Example 36 | Example 37 | Example 38 |
|---|---|---|---|---|---|---|
| Compounding recipe (parts) | | | | | | |
| commonly used polyhydroxyl compound E(1) | | | | | | |
| commonly used polyhydroxyl compound F(2) | | | | | | |
| commonly used polyhydroxyl compound G(3) | 44.3 | | | | | |
| commonly used polyhydroxyl compound H(4) | | 64.9 | 48.7 | 32.4 | | |
| commonly used polyhydroxyl compound I(5) | | | | | 43.3 | |
| commonly used polyhydroxyl compound J(6) | | | | | | 48.3 |
| 3-methylpentane-1,3,5-triol | 10.6 | 10.6 | 15.9 | 21.2 | 15.9 | 10.6 |
| blend ratio | 2/1 | 2/1 | 1/1 | 1/2 | 1/1 | 2/1 |
| Foaming behavior | | | | | | |
| miscibility of premix composition | miscible | miscible | miscible | slightly immiscible | slightly immiscible | slightly immiscible |
| cream time (second) | 80 | 37 | 33 | 50 | 40 | 70 |
| rise time (second) | 175 | 102 | 122 | 129 | 91 | 272 |
| Foam density (g/cm$^3$) | 0.0341 | 0.0314 | 0.0298 | 0.0333 | 0.0293 | 0.0326 |
| Burning characteristics | | | | | | |
| judgement | self-extinguishing | self-extinguishing | self-extinguishing | self-extinguishing | self-extinguishing | non-burn |
| burning distance (mm) | 33 | 31 | 27 | 30 | 44 | |
| Smoke development | | | | | | |
| smoke ratio (wt. %) | 9.7 | 8.9 | 8.4 | 9.0 | 9.6 | |

Note:
(4) aromatic base polyol, hydroxyl number 410, made by Dainippon Ink Kagaku Kogyo Co. Ltd., trade name Hyprox R-910.
(5) sugar based polyol, hydroxyl number 460, made by Dainippon Ink Kagaku Kogyo Co. Ltd., trade name Hyprox RO-856.
(6) sucrose based polyol, hydroxyl number 550, made by Asahi Denka Kogyo Co. Ltd., trade name Adeka Polyether SC-800.

From the data of Table 4, it can be seen that the rigid polyurethane foam having excellent flame retardance and low-smoke development can easily be produced by blending each of various commonly used polyhydroxyl compounds with 3-methylpentane-1,3,5-triol.

EXAMPLES 39–49

Rigid polyurethane foams were produced under the same conditions as described in Example 2 except that various commonly used polyhydroxyl compounds as shown in the following Table 5 are used as the polyhydroxyl compound and the blend ratio of 3-methylpentane-1,3,5-triol and isocyanate index are changed. The results measured on the burning characteristics and smoke development of the resulting foam are also shown in Table 5.

Table 5(a)

|  | Example 39 | Example 40 | Example 41 | Example 42 | Example 43 | Example 44 |
|---|---|---|---|---|---|---|
| Compounding recipe (parts) | | | | | | |
| commonly used polyhydroxyl compound E | 52.0 | 38.3 | | | | |
| commonly used polyhydroxyl compound F | | | 55.8 | 41.1 | | |
| commonly used polyhydroxyl compound G | | | | | 27.5 | 20.2 |
| commonly used polyhydroxyl compound H | | | | | | |
| commonly used polyhydroxyl compound J | | | | | | |
| commonly used polyhydroxyl compound K(1) | | | | | | |
| commonly used polyhydroxyl compound L(2) | | | | | | |
| 3-methylpentane-1,3,5-triol | 13.1 | 9.7 | 17.5 | 12.9 | 13.1 | 9.7 |
| blend ratio | 1/1 | 1/1 | 1/2 | 1/2 | 1/1 | 1/1 |
| isocyanate index | 120 | 160 | 120 | 160 | 120 | 160 |
| Foaming behavior | | | | | | |
| miscibility of premix composition | miscible | miscible | miscible | miscible | miscible | miscible |
| cream time (second) | 46 | 38 | 29 | 25 | 58 | 50 |
| rise time (second) | 89 | 75 | 73 | 63 | 120 | 103 |
| Foam density (g/cm$^3$) | 0.0320 | 0.0304 | 0.0276 | 0.0273 | 0.0272 | 0.0298 |
| Burning characteristics | | | | | | |
| judgement | self-extinguishing | non-burn | self-extinguishing | self-extinguishing | self-extinguishing | self-extinguishing |
| burning distance (mm) | 42 | | 35 | 29 | 38 | 36 |
| Smoke development | | | | | | |
| smoke ratio (wt. %) | 10.6 | 10.4 | 9.2 | 9.4 | 10.1 | 9.9 |

Table 5(b)

|  | Example 45 | Example 46 | Example 47 | Example 48 | Example 49 |
|---|---|---|---|---|---|
| Compounding recipe (parts) | | | | | |
| commonly used polyhydroxyl compound E | | | | | |
| commonly used polyhydroxyl compound F | | | | | |
| commonly used polyhydroxyl compound G | | | | | |
| commonly used polyhydroxyl compound H | 40.2 | | | | |
| commonly used polyhydroxyl compound J | | 14.7 | | | |
| commonly used polyhydroxyl compound K(1) | | | 32.3 | 23.8 | |
| commonly used polyhydroxyl compound L(2) | | | | | 29.9 |
| 3-methylpentane-1,3,5-triol | 13.1 | 12.9 | 13.1 | 9.7 | 13.1 |
| blend ratio | 1/1 | 1/2 | 1/1 | 1/1 | 1/1 |
| isocyanate index | 120 | 160 | 120 | 160 | 120 |
| Foaming behavior | | | | | |
| miscibility of premix composition | slightly immiscible | slightly immiscible | slightly immiscible | slightly immiscible | slightly immiscible |
| cream time (second) | 40 | 45 | 30 | 30 | 30 |
| rise time (second) | 76 | 100 | 58 | 63 | 65 |
| Foam density (g/cm$^3$) | 0.0307 | 0.0277 | 0.0247 | 0.0250 | 0.0239 |
| Burning characteristics | | | | | |
| judgement | self-extinguishing | self-extinguishing | self-extinguishing | self-extinguishing | self-extinguishing |
| burning distance (mm) | 27 | 32 | 31 | 28 | 41 |
| Smoke development | | | | | |
| smoke ratio (wt. %) | 9.4 | 9.5 | 8.9 | 8.8 | 9.6 |

Note:
(1) glycerine-based triol, hydroxyl number 524, made by Asahi Denka Kogyo Co. Ltd., trade name Adeka Polyether G-300
(2) pentaerythritol-based tetraol, hydroxyl number 415, made by Dainippon Ink Kagaku Kogyo Co. Ltd., trade name Hyprox RQ-500.

EXAMPLE 50, COMPARATIVE EXAMPLE 3

A rigid polyurethane foam was produced from the compound recipe as shown in the following Table 6 in the same manner as described in Example 1, except that polyether-polyol having a hydroxyl number of 400, which was produced by starting from 3-methylpentane-1,3,5-triol in the procedure of Example 1 described in Japanese Patent Laid Open No. 88,041/75, is used as the polyhydroxyl compound.

Table 6

|  | Comparative Example 3 | Example 50 |
|---|---|---|
| Compounding recipe (parts) | | |
| crude MDI | 100 | 100 |
| commonly used polyhydroxyl compound | 83.5 | 41.8 |
| 3-methylpentane-1,3,5-triol | — | 13.4 |
| KOAc/DEG | 2.4 | 2.4 |
| P-41 | 0.5 | 0.5 |
| SH-193 | 1.0 | 1.0 |
| F-11 | 30 | 25 |
| blend ratio | — | 1/1 |
| isocyanate index | 120 | 120 |
| Foaming behavior | | |
| miscibility of premix composition | miscible | slightly immiscible |
| cream time (second) | 45 | 43 |
| rise time (second) | 106 | 97 |
| Foam density (g/cm$^3$) | 0.0296 | 0.0293 |
| Burning characteristics | | |
| judgement | burn | self-extinguishing |
| burning distance (mm) |  | 46 |
| Smoke development | | |
| smoke ratio (wt. %) | 11.0 | 9.4 |

From the data of Table 6, it can be seen that 3-methylpentane-1,3,5-triol does not impart the flame retardance to the polyurethane foam produced by using the polyether-polyol without adding 3-methylpentane-1,3,5-triol but the flame retardance and low-smoke development are first obtained by adding 3-methylpentane-1,3,5-triol in the reaction of the polyether-polyol with the organic polyisocyanate.

COMPARATIVE EXAMPLES 4–9

The same procedure as described in Example 1 was repeated to produce a rigid polyurethane foam except that various low molecular weight polyhydroxyl compounds are used instead of 3-methylpentane-1,3,5-triol. In the following Table 7 are shown the miscibility of the premix composition and the burning characteristics of the foam.

Table 7

|  | Comparative Example 4 | Comparative Example 5 | Comparative Example 6 | Comparative Example 7 | Comparative Example 8 | Comparative Example 9 |
|---|---|---|---|---|---|---|
| Compounding recipe (parts) | | | | | | |
| glycerine | 9.5 | | | | | |
| diethylene glycol | | 16.4 | | | | |
| 1,4-butane diol | | | 13.9 | | | |
| 1,5-pentane diol | | | | 16.0 | | |
| 1,2,6-hexane triol | | | | | 13.8 | |
| diethanolamine | | | | | | 10.8 |
| Foaming behavior | | | | | | |
| miscibility of premix composition | immiscible (separation) | miscible | miscible | miscible | miscible | miscible |
| cream time (second) | 11 | 13 | 16 | 15 | 14 | neither agitated |
| rise time (second) | 29 | 34 | 36 | 35 | 33 | nor foamed due to |

Table 7-continued

| | Comparative Example 4 | Comparative Example 5 | Comparative Example 6 | Comparative Example 7 | Comparative Example 8 | Comparative Example 9 |
|---|---|---|---|---|---|---|
| Foam density (g/cm³) | 0.0219 | 0.0203 | 0.0240 | 0.0243 | 0.0256 | rapid reaction |
| Burning characteristics | | | | | | |
| judgement | burn | burn | burn | burn | self-extinguishing | — |
| burning distance (mm) | | | | | 86 | |

From the data of Table 7, it is apparent that 3-methyl-pentane-1,3,5-triol has a peculiar effect on the flame-retardance and low-smoke development of the foam.

Moreover, when two commonly used polyhydroxyl compounds, for example BPX-11 and EDP-450 are mixed without using 3-methylpentane-1,3,5-triol, it has been confirmed that the resulting polyurethane foam is combustible.

COMPARATIVE EXAMPLE 10

A flexible polyurethane foam was produced by using a compounding recipe composed of 100 parts of polyoxypropylene triol (hydroxyl number 55.5, made by Mitsui Nisso Urethane Co. Ltd., trade name PPG-3025 BM) usually used in the production of flexible polyurethane foams, 4.4 parts of 3-methylpentane-1,3,5-triol, 3 parts of water, 0.2 part of 70% bis-(β-dimethylaminoethyl)ether-30% dipropylene glycol solution (made by Union Carbide Corp., trade name A-1), 0.2 part of tin octanoate, 1.5 parts of silicone surfactant (made by Toray Silicone Co., Ltd., trade name SRX-253) and 50.8 parts of tolylene diisocyanate (2,4-isomer:2,6-isomer=80:20). In this case, the flexible polyurethane foam having healthy bubbles and a slight shrinkage tendency was obtained under conditions of a cream time of 25 seconds and a rise time of 100 seconds. This foam was burning according to the combustion test ASTM D-1692. This fact shows that the flameproofing effect of 3-methylpentane-1,3,5-triol is not developed in the flexible foam but is peculiarly developed in the rigid foam.

What is claimed is:

1. In a process for producing a rigid polyurethane or polyisocyanurate foam having excellent flame-retardance and low-smoke development by reacting a polyhydroxyl compound with an organic polyisocyanate in the presence of a blowing agent, a surfactant and a catalyst, the improvement comprising using 3-methyl-pentane-1,3,5-triol in admixture with said polyhydroxyl compound, in an amount of 0.2-2.0 equivalent of said triol per equivalent of said polyhydroxyl compound.

2. A process as claimed in claim 1, wherein said polyhydroxyl compound is one having 3 or more hydroxyl groups in its molecule and a hydroxyl number of not less than 100.

3. A process as claimed in claim 1, wherein said polyhydroxyl compound is selected from the group consisting of polyether-polyols and polyester-polyols.

4. A process as claimed in claim 3, wherein said polyether-polyol is one obtained by addition reaction of an active hydrogen compound with an alkylene oxide.

5. A process as claimed in claim 4, wherein said active hydrogen compound is selected from the group consisting of glycerine, trimethylol propane, 3-methylpentane-1,3,5-triol, pentaerythritol, sorbitol, sucrose, bisphenol-A, ethylenediamine and diethylenetriamine.

6. A process as claimed in claim 4, wherein said alkylene oxide is selected from the group consisting of ethylene oxide, propylene oxide and butylene oxide.

7. A process as claimed in claim 3, wherein said polyester-polyol is one having a hydroxyl group at its terminals and obtained by condensation reaction of a dicarboxylic acid selected from adipic acid and phthalic acid with a polyhydric alcohol selected from ethylene glycol and trimethylol propane.

8. A process as claimed in claim 1, wherein said organic polyisocyanate is an aromatic polyisocyanate.

9. A process as claimed in claim 1, wherein said organic polyioscyanate is a mixture of polymethylene polyphenyl isocyanates having the following formula

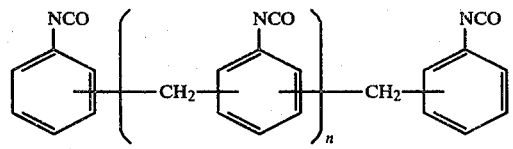

wherein n is 0 or an integer of more than 1.

10. A process as claimed in claim 1, wherein the ratio of said organic polyisocyanate used per total amount of said polyhydroxyl compound is within a range of 90-150 when using a catalyst commonly used for the production of polyurethane foam as said catalyst or within a range of 100-250 when using an isocyanurate forming catalyst as said catalyst.

11. A process as claimed in claim 1, wherein said catalyst is selected from catalysts commonly used for the production of polyurethane and polyisocyanurate.

12. A process as claimed in claim 11, wherein said catalyst commonly used for the production of polyurethane foam is selected from the group consisting of triethylamine, triethylenediamine, tetramethylenediamine, dimethylethanolamine, dimethylcyclohexylamine, stannous octoate, dibutyltin dilaurate and lead octylate.

13. A process as claimed in claim 11, wherein said catalyst commonly used for the production of polyisocyanurate foam is selected from the group consisting of N,N',N''-tris(dialkylaminoalkyl)-sym-hexahydrotriazine, 2,4,6-tris(dimethylaminomethyl)phenol, 1,8-diazabicyclo(5,4,0)undecene-7, potassium acetate, potassium propionate, potassium caprylate, potassium 2-ethyl hexanoate, potassium adipate and sodium benzoate.

14. A process as claimed in claim 1, wherein said blowing agent is a low-boiling inert organic compound.

15. A process as claimed in claim 1, wherein said blowing agent is trichloromonofluoromethane.

* * * * *